United States Patent
Toshinsky

(10) Patent No.: US 9,899,111 B2
(45) Date of Patent: Feb. 20, 2018

(54) METHOD FOR LONG-TERM STORAGE OF WASTE NUCLEAR FUEL

(71) Applicant: JOINT STOCK COMPANY "AKME-ENGINEERING", Moscow (RU)

(72) Inventor: Georgiy Ilich Toshinsky, Obninsk (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 0 days.

(21) Appl. No.: 14/908,049

(22) PCT Filed: Mar. 19, 2014

(86) PCT No.: PCT/RU2014/000169
§ 371 (c)(1),
(2) Date: Jan. 27, 2016

(87) PCT Pub. No.: WO2015/016741
PCT Pub. Date: Feb. 5, 2015

(65) Prior Publication Data
US 2016/0163406 A1    Jun. 9, 2016

(30) Foreign Application Priority Data
Jul. 31, 2013 (RU) ................. 2013135672

(51) Int. Cl.
G21F 9/36 (2006.01)
G21F 9/34 (2006.01)
G21F 9/30 (2006.01)

(52) U.S. Cl.
CPC ............ *G21F 9/36* (2013.01); *G21F 9/308* (2013.01); *G21F 9/34* (2013.01)

(58) Field of Classification Search
None
See application file for complete search history.

(56) References Cited

U.S. PATENT DOCUMENTS

| | | | |
|---|---|---|---|
| 3,962,587 A | | 6/1976 | Dufrane et al. |
| 4,528,011 A | * | 7/1985 | MacEdo .............. G21F 9/02 65/30.13 |
| 4,847,008 A | * | 7/1989 | Boatner .............. G21F 9/305 501/22 |
| 5,678,236 A | | 10/1997 | MacEdo et al. |
| 5,887,042 A | | 3/1999 | Akamatsu et al. |
| 6,802,671 B1 | | 10/2004 | Badie et al. |
| 8,098,790 B2 | | 1/2012 | Singh |
| 8,662,338 B2 | * | 3/2014 | Moricca ............. G21F 5/00 220/303 |
| 2002/0196890 A1 | * | 12/2002 | Shimizu ............. G21C 19/06 376/273 |
| 2009/0069621 A1 | | 3/2009 | Singh et al. |
| 2010/0183110 A1 | | 7/2010 | Chiocca et al. |
| 2014/0066685 A1 | * | 3/2014 | Kato .................. G21F 5/005 588/16 |

FOREIGN PATENT DOCUMENTS

| | | |
|---|---|---|
| DE | 3816195 | 11/1989 |
| JP | 2005315803 | * 11/2005 |
| KR | 20120137799 | * 12/2012 |
| RU | 97100888 | 2/1999 |
| RU | 2231837 | 6/2004 |
| RU | 2403633 | 11/2010 |
| RU | 2407083 | 12/2010 |
| RU | 122200 | 11/2012 |
| SU | 1350663 | 11/1987 |
| WO | 2008125803 | 10/2008 |

OTHER PUBLICATIONS

Zrodnikov, A. V. et al., "Problems and Approaches to Handling of Waste Nuclear Fuel of Liquid-Metal Reactors of Nuclear Submarines," Higher Education Institutions Bulletin, Nuclear Power Industry—Ministry of Education and Science of the Russian Federation, Obninsk, No. 1, 2007, pp. 13-22.
English Abstract of DE 3816195.
English Abstract of RU 122200.
English Abstract of SU 1350663.
International Search Report dated Aug. 7, 2014.
Translation of International Search Report dated Aug. 7, 2014.
Written Opinion of the International Searching Authority dated Jul. 2, 2014.
Translation of Written Opinion of the International Searching Authority dated Jul. 2, 2014.
International Preliminary Report on Patentability dated Feb. 2, 2016.

* cited by examiner

*Primary Examiner* — Sheng H Davis
(74) *Attorney, Agent, or Firm* — Preston Smirman; Smirman IP Law, PLLC

(57) ABSTRACT

The method for the long-term storage of waste nuclear fuel of a nuclear reactor consists in that, first, prior to the waste fuel assembly of the nuclear reactor being disposed in a steel case and the latter being hermetically sealed with a cover, a material which is chemically inert in relation to the material of the casing of the fuel elements of the waste fuel assemblies, to the material of the body of the case, to air and to water, is arranged in the steel case, the steel case is mounted in a heating device, the steel case is heated along with the material arranged in said steel case until said material passes into a liquid state, and then the waste fuel assembly which has been extracted from the nuclear reactor is arranged in the steel case in such a way that the fuel part of the fuel elements of the waste fuel assemblies is lower than the level of the liquid material in the steel case, the waste fuel assembly is fixed in this position, and the case is hermetically sealed by the cover, whereupon the hermetically sealed steel case is extracted from the heating device and mounted in a storage facility which is cooled by atmospheric air. This technical solution makes it possible to ensure long-term safe storage of waste fuel assemblies of a nuclear reactor in storage facilities with cooling using atmospheric air, in particular with natural circulation of atmospheric air, and also to transport the waste fuel assemblies to a factory for processing so as to ensure an increased level of safety.

2 Claims, No Drawings

METHOD FOR LONG-TERM STORAGE OF WASTE NUCLEAR FUEL

CROSS-REFERENCE TO RELATED APPLICATION

The instant application is a national phase of PCT International Application No. PCT/RU2014/000169 filed Mar. 19, 2014, and claims priority to Russian Patent Application Serial No. 2013135672, filed Jul. 31, 2013, the entire specifications of both of which are expressly incorporated herein by reference.

FIELD OF THE INVENTION

The invention relates to a field of nuclear technology, and more particularly to a method for long-term safe storage of waste nuclear fuel of nuclear reactors.

BACKGROUND OF THE INVENTION

Long-term (for decades) safe storage of waste nuclear fuel (WNF), particularly waste fuel assemblies (WFA) of nuclear reactors poses a complex technical challenge. This is due to the fact that there is a high radiation potential associated with radioactivity of fuel materials' nuclear fission products contained in WNF, and also with radioactivity of secondary nuclear fuel (Plutonium) and minor actinides (Neptunium, Americium, Curium) formed during operation of nuclear reactor (NR) when exposed to neutrons of primary nuclear fuel.

Damage of the principal safety barrier, the casing of fuel element (FE), resulting from corrosion, thermal and mechanical impact, will lead to escape of radioactivity and will cause serious radioecological consequences.

The problem is further complicated by the fact that WNF is an irremovable source of afterpower, emission of which gradually decreases over time, but even after many years it requires an organized heat removal, the failure of which will cause an increase in WNF temperature and loss of hermetically sealed state of FEs casing.

Currently, the customary method for long-term storage of WNF consists in arranging WFA in cooling ponds (CPs) filled with water which removes afterpower of WFA. Since water in the CPs may be radioactive, it is cooled using a heat exchanger connected to an external source of cooling water.

The prior art discloses methods for storage of waste nuclear fuel in cooling ponds.

For example, there is a method known in the art for storage of waste nuclear fuel by placing cases perforated at their top and filled with desalinated water in ponds with desalinated water. The level of water in the cases and the pond is kept below the edge of the holes by intermittently feeding desalinated water from a stand-alone reservoir to the cases and the pond. In addition, it has been proposed to feed water to the cases intermittently, upon reaching maximum allowable level in test cases with a maximum value of afterpower (RU patent 2403633, G21C19/06, G21F9/36, 2010).

The prior art also discloses a method for storage of radioactive materials, including a) submersion of a container having a top part, a bottom part and a cavity inside the container housing for filling of water, b) installation of a radioactive material inside the cavity of the container placed for water filling, c) lifting of the submerged contained until its top part is disposed above water reservoir surface level with the main part of the container remaining below water reservoir surface level, and d) removal of water from the cavity of the container with the top part of the container remaining above water reservoir surface level, and the remaining part of the container being submerged (US patent application US2009069621, G21F5/005, 2009).

There is known a method used in waste nuclear fuel storage facilities, at NPPs and waste nuclear fuel reprocessing plants. For long-term storage of waste nuclear fuel in cases filled with water, placed in a water pond under a beam floor using suspension rods, the supporting parts of the cases are installed on the bottom of the pond, and the upper end of the cases is placed under the beam floor with a clearance of 100÷150 mm and case density based on 30÷50 cases per square meter of the pond bottom area (RU patent 2407083, G21C19/22, 2010).

The practice of using such method for WNF storage has shown that over time under the action of corrosive processes there occurs a loss of tightness of the container or case with waste nuclear fuel in cooling ponds as well as radioactive contamination of water.

In order to prevent this phenomenon, lately a "dry" storage of WFA has been used, wherein the WFA, after being stored in cooling ponds for some time (approximately three years) and after reduction of afterpower, is removed from the cooling ponds and placed into hermetically sealed cases, which are placed in an air-cooled "dry" storage facility.

It is known that as a result of the accident at the Fukushima-1, due to failure of water cooling system power supply, there occurred evaporation of water in the cooling ponds, overheating of FEs, destruction of their bodies accompanied by the formation of a large quantity of oxygen formed during zirconium-steam reaction, and emission of radioactivity to the environment.

In view of such a situation, it seems quite reasonable to switch to the "dry" WNF storage, omitting the stage of "wet" storage inside the cooling ponds.

There are known methods for storage, which utilize a "dry" storage technique, described in U.S. Pat. No. 6,802,671, DE 3816195, U.S. Pat. No. 5,887,042, U.S. Pat. No. 8,098,790.

The prior art describes a method for transportation and/or storage of nuclear materials, wherein the nuclear materials are arranged inside a container with radiation shielding made of cast lead arranged over metal framing (US application US2010183110, G21F5/008, 2010)

This invention provides for presence of at least one level of radiation shielding which consists of at least one metal framing which is aligned along the longitudinal axis and enveloped with a block of lead or one of lead alloys, cast over the metal framing, with metal framing being equipped with at least one element for preventing cast lead (or one of its alloys) block from moving longitudinally. In addition, the said metal framing is embedded in the block cast from lead (or one of its alloys) at least by a portion of its length along the longitudinal axis, and in the preferred embodiment—along the whole length of the block. Thus, a solid mechanical connection of a metal framing and the lead (or one of its alloys) block is created, and a relative longitudinal movement of these two elements relative to each other in case of a free falling of a package, is precluded.

The prior art also describes a method for storage of waste nuclear fuel in a convection-cooled container, wherein a bag with waste fuel is arranged inside a metal tank with hermetically sealed covers, with the tank having heat-removing side and end ribs, which at the same time act as distancing and damping elements. The tank is mounted inside the housing of the container while creating a clearance for air passage, with the ribs of the tank being in contact with the bottom and the side surface of the container's interior. The housing of the container is formed of outer and inner metal casings, space between which is filled with a radiation protection material, for example, with a heat-resistant concrete and/or neutron-absorbing composition. Between the casings, there are reinforcing heat-removing elements made in the form of perforated metal plates welded onto the inner casing and tightly contacting with the outer casing, mounted along the tangent to the inner casing. In the bottom part of the housing, the inlet cooling ducts are made, and in the cover, the outlet cooling ducts are made. In case of depressurization of the tank, the cooling ducts are closed with blind covers (RU patent 2231837, G21F5/008, 2004).

The disadvantage of this technical solution is that there is a possibility of radioactivity emissions to the environment in case of depressurization of metal tank, inside which the bag with the waste nuclear fuel is placed.

The closest analog of the claimed invention is the method for "dry" storage of WNF from reactors of nuclear submarines (NSs), wherein the unloaded waste removable part (WRP) along with the active core with WNF being a part of it, is, immediately after unloading, placed into one of the boxes of the preliminary cooldown storage facility in a steel hermetically sealed tank, inside of which a liquid melt of Pb—Bi, preliminarily heated above its melting temperature, was contained. A hermetically sealed cap is mounted atop of the tank. After disconnection of the heating system, reduction of the afterheat and solidifying of the eutectics, the tank with the WRP is moved to the box of the long-term cooldown storage facility for its further storing for 3-5 years or more (Zrodnikov A. V, et al.). Problems and approaches to handling of waste nuclear fuel of liquid-metal reactors of nuclear submarines. Higher education institutions bulletin Nuclear power industry—Ministry of Education and Science of the Russian Federation, Obninsk: No 1, 2007, p. 16).

The disadvantage of the closest analog lies in the extremely limited field of use—only the active cores of the reactors of NSs, unloaded in whole as a part of WRP, having a very low level of afterpower at the time of unloading. This is caused by two factors: 1) reactors of NSs are mainly operated at low power levels; and 2) refueling is timed to confine with the yard repairs of the NSs, that's why the unloading is performed after a sufficiently long period upon shutdown of the reactor.

For reactors of civil-use nuclear power plants, such method of unloading and storage of WNF is inapplicable due to high level of afterpower, caused by operation of the reactor, mainly, at nominal power level, and a short period of cooldown prior to unloading of the WNF. For the same reason, it is inapplicable to use eutectic Pb—Bi alloy having a low melting temperature (123.5° C.) as a heat-transfer medium, because this heat-transfer medium will be in a liquid state for a long time and will not function as an additional safety barrier.

Moreover, such storage method does not allow transportation of WNF to a reprocessing plant in accordance with the applicable regulatory documents. A labor-consuming disassembly of the active core, being a source of a high nuclear and radiation hazard, is required.

Disclosure of the Invention

The object of the invention lies in increasing the safety of long-term storage of waste nuclear fuel when storing the waste fuel assemblies of the nuclear reactor in storage facilities with cooling using atmospheric air, preferably with natural circulation of atmospheric air.

The set object is achieved by forming a multi-barrier protection on the way of emission of radioactivity to the environment. The multi-barrier protection is formed by heating a steel case for WFA, filled with material which has a sufficiently high melting temperature, chemically inert in relation to the material of the casing of the FEs of the WFA, to the material of the body of the case, to air and to water, until it is melted, placing the WFA inside a hermetically sealed heated steel case, wherein the above material is contained in a liquid state. After removing the case from the heating device, it is placed inside a "dry" WNF-storage facility with atmospheric air cooling. After solidifying the material, which is chemically inert in relation to the material of the casing of the FEs of the WFA, to the material of the body of the case, to air and to water, inside the steel case, a multi-barrier protection on the way of emission of radioactivity to the environment is formed, ensuring a long-term reliable and safe storage of the WFA. The case may be further arranged in a box of a "dry" storage facility cooled with naturally circulated atmospheric air, or in a convection-cooled container, made, for example, according to a closest analog RU patent 2231837, inside which the WFA may be transported to the reprocessing plant.

By choosing a case filling material having a sufficiently high heat conductivity, the allowable temperature of casings of the ELs of the WFA is not exceeded even with natural circulation of atmospheric air, which ensures a passive heat-removal for an indefinite period of time.

EMBODIMENTS OF THE INVENTION

The method for long-term safe storage of WNF consists of the following.

Prior to unloading the WFA from the nuclear reactor, a steel ribbed case, which is preliminarily filled with a necessary amount of material, which is chemically inert in relation to the materials of the casing of the FEs, to the material of the body of the case, to air and to water, having an acceptable melting temperature and heat conductivity, e.g. lead, is mounted in the heating device.

Under the effect of heat emitted by the heating device, lead is converted into liquid state (melting temperature 327° C.).

Using proper accessories, the WFA is removed from the nuclear reactor and placed inside the case so that the fuel portion of the FEs remains below the level of liquid lead in the case and is fixed in this position by mechanical devices installed in the case and/or in the grill of the WFA. After that, the case is hermetically sealed with cover.

The hermetically sealed case is further extracted from the heating device and mounted in the appropriate box of the "dry" storage which is cooled using naturally circulated atmospheric air. Material, with which the WFAs are filled, solidifies, creating a multi-barrier protection—each FE of the WFA is individually enveloped with a layer of lead, and the whole WFA is also wrapped all around by a layer of lead, disposed between the WFA and the inner wall of the steel case housing.

Thereafter, a protector plug is mounted inside the hole of the box of the storage facility, whereupon the described cycle is repeated.

The invention claimed is:

1. A method for the long-term storage of waste nuclear fuel of a nuclear reactor, comprising the steps of:
   providing a steel case;
   providing a block of material that is chemically inert to: casings of fuel elements of waste fuel assemblies, to the steel case, and to air and water;
   wherein the block of chemically inert material is lead;
   arranging the block of chemically inert material in the steel case;
   mounting the steel case in a heating device;
   heating the steel case, along with the block of chemically inert material arranged in the steel case, until the block of chemically inert material is liquefied;
   extracting the waste fuel assemblies from the nuclear reactor;
   placing the waste fuel assemblies in the steel case;
   wherein the liquefied chemically inert material envelopes the waste fuel assemblies;
   wherein the waste fuel assemblies have been positioned in the steel case in such a way that a fuel part of the fuel elements of the waste fuel assemblies is lower than a level of the liquefied chemically inert material in the steel case, wherein the waste fuel assemblies are fixed in this position;
   hermetically sealing the steel case with a cover;
   extracting the hermetically sealed steel case from the heating device; and
   mounting the hermetically sealed steel case in a storage facility that is cooled by atmospheric air.

2. The method according to claim 1, wherein the storage facility that is cooled using atmospheric air includes boxes for the steel cases with the waste fuel assemblies and protector plugs above each box, wherein the storage facility is closed after it is filled up, and wherein cooling of the steel cases in the storage facility is performed using natural circulation of atmospheric air.

* * * * *